United States Patent Office 3,006,755
Patented Oct. 31, 1961

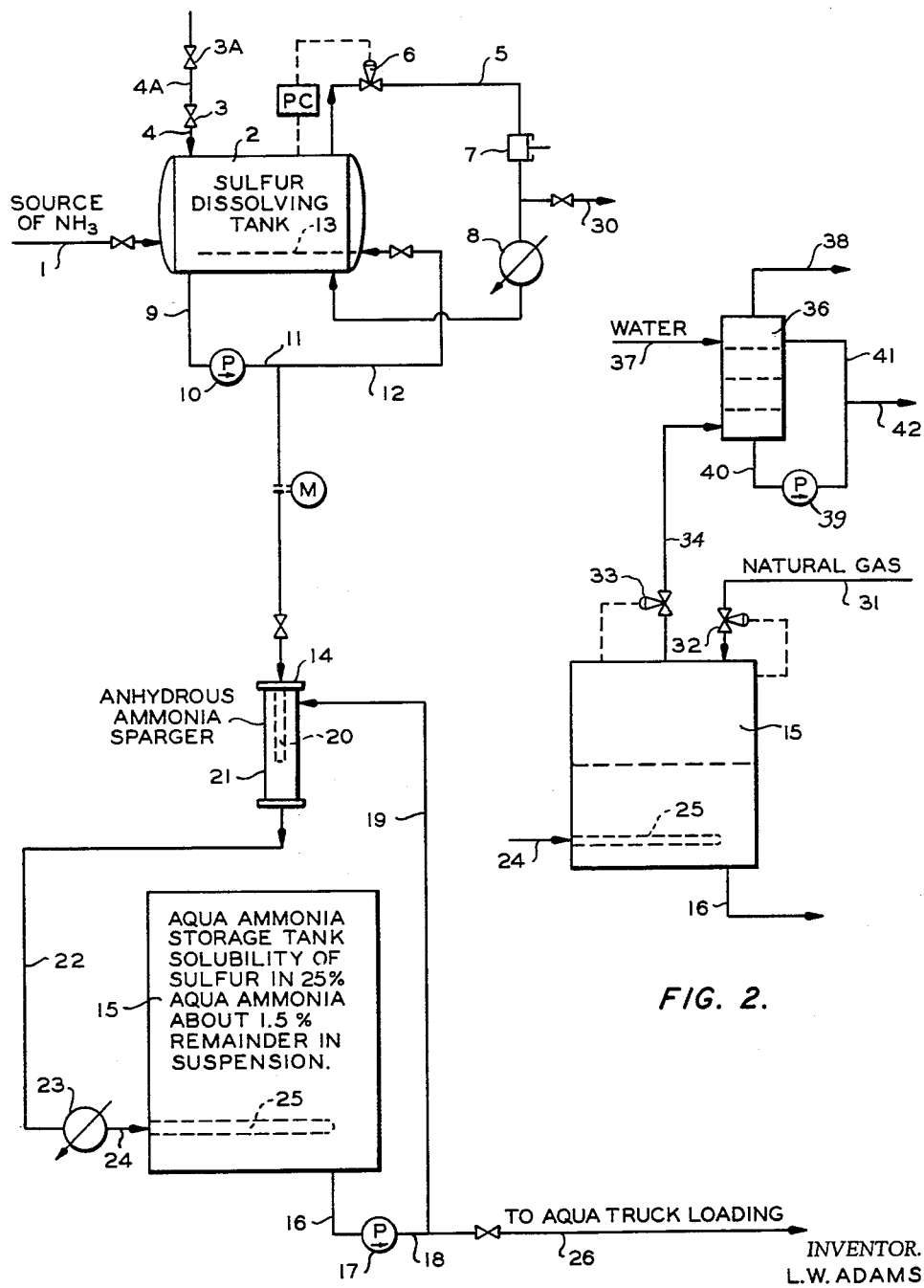

3,006,755
SUSPENSION OF SULFUR IN AQUA AMMONIA
AND METHOD AND APPARATUS FOR PRO-
DUCING SAME
Loyd W. Adams, Bartlesville, Okla., assignor to Phillips
Petroleum Company, a corporation of Delaware
Filed July 16, 1957, Ser. No. 672,237
11 Claims. (Cl. 71—61)

This invention relates to a suspension of sulfur in aqua ammonia and to a method and apparatus for producing the same. In one of its aspects, the invention relates to a novel composition or suspension containing sulfur suspended in aqua ammonia. In another of its aspects, the invention relates to a method of making a suspension of sulfur in aqua ammonia by contacting the sulfur with liquid ammonia to form a solution of sulfur in the ammonia and then contacting said sulfur solution in ammonia with one of water and aqua ammonia to form the final product. In another of its aspects, the invention relates to an apparatus for preparing a suspension of sulfur in aqueous ammonia, the apparatus comprising a sulfur dissolving tank, means upon said tank for adding sulfur to the inside of said tank, means upon said tank for adding liquid ammonia to the inside of said tank, means for removing liquid phase from the bottom of said tank and recirculating said phase to the bottom thereof, means on said tank for removing vapors of ammonia above a predetermined pressure thereof from the vaporous phase in said tank, means associated with said last means to liquefy said vapors, and to return said vapors to said tank, and means for withdrawing sulfur solution from said tank and for contacting said sulfur solution withdrawn from said tank with aqueous ammonia and/or with water.

The novel suspension of sulfur in aqua ammonia prepared according to this invention is suitable for use as a fertilizer. When used as fertilizer, the suspension or composition of the invention as such or further diluted with, say, water can be sprayed onto the ground or injected into the ground according to the methods conventional for application of essentially liquid fertilizers.

Therefore, in another of its aspects, the invention relates to a method of fertilizing soil by applying thereto a suspension prepared according to at least one form of the present invention.

I have found that anhydrous ammonia will dissolve sulfur and further that this solution, when mixed with water or an aqueous solution of ammonia, will form a suspension of sulfur in aqua ammonia.

It is an object of this invention to provide a suspension of sulfur in aqua ammonia. Another object of the invention is to provide a method for the preparation of a suspension of sulfur in aqua ammonia. A still further object of the invention is to provide an apparatus for preparing a suspension of sulfur in aqua ammonia. A further object still is the provision of a sulfur suspension in aqua ammonia possessing utility as a fertilizer.

Other aspects, objects and the several advantages of the invention will be apparent to one skilled in the art having studied this disclosure, the drawing and the appended claims.

According to the present invention, a novel composition or suspension of sulfur in aqua ammonia suitable for use as fertilizer, and for other purposes, is prepared by contacting sulfur with liquid ammonia to form a solution of sulfur in said liquid ammonia and then contacting said solution of sulfur and liquid ammonia with water and/or aqueous ammonia. Also, according to the invention, an apparatus for contacting the sulfur with the liquid ammonia, essentially in anhydrous form, to form the said solution of sulfur in liquid ammonia and to then contact said solution of sulfur and liquid ammonia with water and/or aqueous ammonia has been provided.

FIGURE 1 of the drawing is a diagrammatic showing of an embodiment of the invention. FIGURE 2 shows a modification of the operation of FIGURE 1.

In FIGURE 1 of the drawing, ammonia is passed by way of conduit 1 into sulfur dissolving tank 2. Sulfur is added by way of valve 3 and conduit 4 and dissolved in liquid ammonia in tank 2. To provide a seal to prevent air from entering into tank 2 and more especially to avoid escape of ammonia gas, a lock chamber 4A is provided or formed in pipe 4 between valves 3 and 3A. The liquid ammonia in tank 2 is maintained at a temperature favoring solution of sulfur and at a pressure sufficient to maintain liquid phase. To this end are provided circulation conduit 5 equipped with valve 6, compressor 7 and cooler 8. Vapors from tank 2 pass by way of pressure controller valve 6 into compressor 7 wherein the vapors are compressed and from compressor 7 to cooler 8 and from cooler 8 as a liquid back to tank 2. In order to provide for agitation of the contents of tank 2, liquid phase is drawn off by way of pipe 9 and pumped by way of pump 10 and line 11, line 12 and perforated pipe 13 into the bottom of tank 2. The liquid phase in pipe 12, in production quantities, is passed by way of meter M into ammonia sparger 14. Aqueous ammonia from storage tank 15 is passed by way of conduit 16, pump 17 and conduit 18 and 19 into the ammonia sparger 14. This sparger can be of conventional type and, as shown in this embodiment of the invention, contains a perforated tube 20 which forms the end of pipe 12. The container or casing portion 21 of the sparger is maintained substantially liquid full and from there the enriched aqua ammonia is withdrawn by way of pipe 22, cooler 23 and returned to aqua ammonia storage tank 15 by way of pipe 24. When the aqueous ammonia mixes with the anhydrous or substantially anhydrous ammonia solution of sulfur, some sulfur will tend to separate out of solution, forming a very fine suspension of sulfur in aqua ammonia. This solution which is pumped to tank 15 by way of pipe 24 enters tank 15 through a perforated pipe 25. The motion of the entering liquid will maintain stirred the contents of storage tank 15. Product is drawn off by way of valve line 26.

The following table illustrates percentage of sulfur in anhydrous ammonia solution at the indicated temperatures.

TABLE I

Solubility of elemental sulfur in anhydrous ammonia

| Temp., °C.: | Percent S is solution |
|---|---|
| −78 | 38.6 |
| −20.5 | 38.1 |
| 0 | 32.3 |
| +16.4 | 25.6 |
| 30 | 21.0 |
| 40 | 18.5 |

In the specific embodiment above described, the essentially anhydrous liquid ammonia is circulated in tank 2 until it is substantially saturated with sulfur, as indicated by mere routine testing, following which it is pumped to the sparger 14. The aqua ammonia in the specific embodiment being described tests approximately 25 percent ammonia and is circulated and mixed with the anhydrous ammonia solution of sulfur to obtain an aqua ammonia containing dissolved 1.5 percent sulfur and the remainder in suspension. Depending upon the amount of aqua ammonia added to the anhydrous ammonia solution of sulfur, suspensions containing more or less sulfur in the suspension or suspended phase can be produced.

From the foregoing table, it will be noted that the amount of sulfur dissolved can be controlled by the pressure and temperature which is maintained on the sulfur dissolving tank 2. The temperature of sulfur dissolving tank 2 can at least in part be adjusted by the quantity of ammonia vapor allowed to be formed in and withdrawn from tank 2. Clearly, the evaporation of ammonia will serve to refrigerate tank 2.

It will be noted from the foregoing table that at −78° C. solutions of sulfur and anhydrous ammonia containing 38.6 percent of sulfur can be formed.

Although various temperatures and pressures can be employed in tank 2, it is clear that according to the present invention a pressure sufficient to maintain a liquid ammonia phase in tank 2 is employed. Furthermore, it is clear from the temperature versus per cent sulfur in solution relationship which has been established, according to the present invention, that the lower the temperature the greater will be the percentage of sulfur in solution. Ideally, an optimum is struck to operate most efficiently at that temperature at which pumping costs, etc. balance most neatly.

Still further as an important consideration of the present invention, it is noted that when the composition of the invention is added to the soil it will oxidize and increase the acidity of the soil. Therefore, in its preferred form the invention contemplates the addition of the product thereof to the soils which are insufficiently acid or, in fact, are basic. Admixture of the composition of the invention with other ingredients or additives to control the acidity or basicity of the soil is contemplated.

It will be noted that the rate of circulation of the bottoms of tank 2 is independent from the rate of circulation of the bottoms of tank 15. Thus, employing the apparatus set forth in the drawing, considerable flexibility of operation is experienced.

The ammonia which enters tank 2 by way of pipe 1 preferably reaches tank 2 under pressure and as a liquid. However, those skilled in the art having studied this disclosure, will at once recognize that the system is self-starting in the sense that a vaporous source of ammonia supplied to tank 2 can be used, the refrigerator compressor 7 being available to compress and to render liquid, with the aid of the water cooled condenser 8, the compressed ammonia vapor. In this manner, tank 2 can be filled to the extent desired with liquid ammonia before any substantial amount of sulfur is added. Likewise, it is possible to fill tank 15 with water which then is pumped by way of the pump 17 to sparger 14 to therein, for the first time, form an aqueous ammoniacal solution of sulfur containing suspended sulfur therein.

It is within the scope of the present invention to add a non-foaming surface active agent selected from the agents, such as aryl alkyl sulfonates, mercaptan-ethylene oxide condensation products and alkylphenol-ethylene oxide condensation products to the composition which is prepared according to the invention to help to maintain the suspension or to readily disperse the non-dissolved sulfur throughout the mass upon mere shaking.

From a consideration of the table, above given, it will be noted that temperatures from about ambient to about −780° C. can advantageously be used. Temperatures outside these ranges can also be used but are not now preferred. Presently, depending upon the economics of the particular location of the plant and availability of materials, costs of operation, etc., a temperature in the range −78° C. to about 0° C. is preferred. Such preference is expressed merely to set forth the mode of operation of the invention which is now contemplated to be its preferred mode of operation. Clearly, as noted, temperatures outside the expressed preferred range can be employed.

The pressure in sulfur dissolving tank usually will be in the range of from about 27 pounds per square inch gauge to about 225 pounds per square inch gauge. In the specific embodiment described, the pressure in tank 2 was maintained approximately at 63 pounds per square inch gauge.

The person skilled in the art, in possession of this disclosure, will routinely supply in its practical execution details of apparatus and modus operandi which here have been omitted for simplicity.

For example, suitable vent and safety valves can be supplied. Thus, simply by way of specific example of a vent valve, valve 30 can be placed on condenser 8 to separate from the liquid phase therein any uncondensed gases including air which may have entered the system occluded in or with the sulfur.

Furthermore, modifications will occur to those reading this disclosure. One modification, for example, is that in which agitators or stirrers are employed in tank 2 to save using pump 10 to cause the contents of tank 2 to more readily result in the desired solution. Similarly, the contents of vessel 15 can be stirred.

Furthermore, in the specific operation described, it is now desirable to maintain a blanket of inert gas in the top of vessel 15. About a pressure of 4 inches of water of natural gas is satisfactory. Should the pressure go too high, a safety valve in a pipe leading to an absorber can be provided. In the absorber water can be used to recover ammonia from the gases thus removed from vessel 15. Thus, in FIGURE 2 natural gas is passed into tank 15 by way of pipe 31 and valve 32. Excess pressure is relieved by way of valve 33 and pipe 34. The ammonia is recovered in tower 36 by water introduced at 37. The gas remaining is removed at 38. Pump 39 circulates the tower bottoms by pipes 40 and 41 back to the top of the tower. Periodically or continuously an amount of water containing ammonia is removed at 42. This water can be used in tank 15, if desired.

Still further, it will be understood that there can be added to the composition of the invention trace elements, say, in the form of water soluble alkaline compounds containing one or more of the elements, zinc boron, iron, etc.

Other modifications in the apparatus, procedure and chemistry of the disclosed invention will be apparent upon careful study of this disclosure.

EXAMPLE

Vessel 2 is evacuated with compressor 7 and the compressed gases, if they are ammonia, are compressed, condensed and passed to storage. If vessel 2 contains air the vessel is evacuated with compressor 7. After evacuation of the vessel, 9500 pounds of sulfur are added through valves 3 and 3A into vessel 2. 15,500 pounds of anhydrous ammonia are added to vessel 2 at 35° F. Ammonia is recirculated through lines 11 and 12 and back into vessel 2 for 4½ hours at a rate of 50 gallons per minute. Ammonia vapors are withdrawn from vessel 2 through line 5, compressed, passed through condenser 8, and returned to vessel 2 causing the sulfur to dissolve. The pressure controller actuates motor valve 6 to hold pressure in vessel 2 at 12 p.s.i.g., which maintains the temperature in vessel 2 about −20° C. When the sulfur in vessel 2 is dissolved in the ammonia it is pumped into sparger 21 at the rate of 20 gallons per minute. 4020 gallons of water, stored in vessel 15, are circulated through lines 16 and pump 17 and lines 18 and 19 to the sparger vessel 21 and by way of line 22, cooler 23 and 24 back to vessel 15, at a rate of 400 gallons per minute, until an emulsion or suspension is formed in vessel 15, the suspension contains 55.8 percent water, 16.8 percent ammonia and 27.4 percent sulfur.

The sulfur emulsion produced in vessel 15 is pumped through lines 16, pump 17 and lines 18 and 26 into tank truck, not shown, and hauled to a field where it is unloaded into a tank of a dispenser. The emulsion is applied with the dispenser to the soil. The sulfur will not settle in either the truck or dispenser during the transit and application of the emulsion since the slightest disturbance prevents settling.

Reasonable variation and modification are possible within the scope of the foregoing disclosure, drawing and the appended claims to the invention, the essence of which is that the following have been provided: a suspension of sulfur in aqueous ammonia which contains also some dissolved sulfur, a method for producing said suspension, as well as an apparatus in which the said method can be effected neatly. Further, a novel fertilizer composition has been provided.

I claim:

1. A method for forming a suspension of sulfur in aqueous ammonia which comprises the steps of intimately mixing essentially only sulfur with liquefied ammonia in a sulfur solution zone under substantially liquid phase conditions so as to cause solution of sulfur in said liquefied ammonia, withdrawing at least a portion of said solution thus obtained from said solution zone, intimately contacting said withdrawn portion with a material selected from the group consisting of water and aqueous ammonia in a mixing zone to obtain said suspension, and recovering said suspension as a product of the method.

2. A method of forming a suspension of sulfur in aqueous ammonia which comprises compressing and liquefying substantially anhydrous ammonia, passing the liquefied ammonia into a sulfur solution zone, maintaining the liquefied ammonia in said zone under pressure sufficient to maintain a liquid ammonia phase, adding essentially only sulfur to the liquid ammonia phase so as to cause solution of sulfur in said phase, removing at least a portion of sulfur in ammonia solution thus obtained from said solution zone, intimately contacting said sulfur in ammonia solution with a material selected from the group consisting of water and aqueous ammonia in a mixing zone to obtain said suspension, and recovering said suspension as a product of the method.

3. A method according to claim 2 wherein ammonia vapors resulting from said solution zone are recovered, liquefied and returned to the liquid phase in said zone.

4. A method according to claim 2 wherein a portion of the liquid phase is removed from said solution zone and returned to the liquid phase in said zone in a manner so as to agitate said phase in said solution zone.

5. A method according to claim 2 wherein the water is contained in aqueous ammonia.

6. A method according to claim 2 wherein the sulfur in ammonia solution is admixed with a circulating suspension of sulfur in aqueous ammonia.

7. An apparatus suitable for the production of a suspension of sulfur in aqueous ammonia which comprises in combination a sulfur dissolving tank, means upon said tank for adding sulfur to the inside of said tank, means upon said tank for adding liquid ammonia to the inside of said tank, means for removing liquid phase from the bottom of said tank and for recirculating said phase into the bottom thereof, means on said tank for maintaining a pressure sufficient to maintain ammonia therein as a liquid, means on said tank for removing vapors of ammonia above a predetermined pressure thereof from the vapor space in said tank, means associated with said last means to liquefy said vapors and to return said vapors to sand tank, mixing means for contacting sulfur solution withdrawn from said tank with aqueous ammonia means for storing a sulfur suspension in aqueous ammonia, means for circulating said suspension from said storage means to said mixing means for contacting with said sulfur solution withdrawn from said tank to obtain said suspension and then returning said suspension thus formed to said storage means.

8. An apparatus for preparing a solution of sulfur and anhydrous ammonia which comprises a sulfur dissolving tank, an inlet for liquid ammonia on said tank, an inlet for adding sulfur to said liquid ammonia on said tank, a valved outlet for removing ammonia vapors from said tank, a pressure responsive control responsive to the pressure in said tank for controlling the valve of said valved outlet, a compressor on the downstream side of the valve in said valved outlet, cooling means on said valved outlet, an inlet to said tank communicating with said valved outlet on the downstream side of said cooling means for returning compressed and cooled ammonia vapors to said tank, an outlet at the bottom of said tank, a pump in said last outlet, an inlet to said tank near the bottom thereof communicating with said pump to permit the pump to circulate bottoms removed from said tank back into the bottom thereof, an outlet from said tank to remove sulfur in ammonia solution therefrom and passing same to a contacting means, means for storing a sulfur suspension in aqueous ammonia, and means for circulating said suspension from said storage means to said contacting means for contacting with said solution and then returning said suspension to said storage means into the liquid phase therein under conditions of turbulence.

9. An apparatus suitable for the production of a suspension of sulfur in aqueous ammonia which comprises, in combination, a sulfur dissolving tank, means upon said tank for adding sulfur to the inside of said tank, means upon said tank for adding liquid ammonia to the inside of said tank, means for removing liquid phase from the the bottom of said tank and for recirculating said phase into the bottom thereof, means on said tank for maintaining a pressure sufficient to maintain ammonia therein as a liquid, means on said tank for removing vapors of ammonia above a predetermined pressure thereof from the vapor space in said tank, means associated with said last means to liquefy said vapors and to return said liquefied vapors to sand tank, means for storing a sulfur suspension in aqueous ammonia, means comprising a sparger for contacting sulfur solution withdrawn from said tank and said sulfur suspension storage means with aqueous ammonia, means for circulating said sulfur suspension from said sulfur suspension storage means to said sparger means and back to said sulfur suspension storage means, and means for discharging said suspension in the liquid phase in said storage means under conditions of turbulence.

10. An apparatus according to claim 9 comprising valved means for introducing an inert gas into an upper portion of said storage means responsive to the pressure therein, valved means for withdrawing vapors from an upper portion of said storage means responsive to pressure therein, means connected to said last mentioned valved means for scrubbing withdrawn vapors with water to recover ammonia therefrom, and means connected to said scrubbing means for returning recovered ammonia to said storage means.

11. An apparatus according to claim 8 comprising valved means for introducing an inert gas into an upper portion of said storage means responsive to the pressure therein, valved means for withdrawing vapors from an upper portion of said storage means responsive to pressure therein, means connected to said last mentioned valved means for scrubbing withdrawn vapors with water to recover ammonia therefrom, and means connected to said scrubbing means for returning recovered ammonia to said storage means.

References Cited in the file of this patent

UNITED STATES PATENTS

| | | |
|---|---|---|
| 1,885,012 | Harvey | Oct. 25, 1932 |
| 1,980,008 | Shoeld | Nov. 6, 1934 |
| 2,086,717 | Kniskern | July 13, 1937 |
| 2,231,423 | Horsley et al. | Feb. 11, 1941 |
| 2,440,738 | Cooper | May 4, 1948 |
| 2,614,040 | Kaikinger | Oct. 14, 1952 |
| 2,631,084 | Robinson | Mar. 10, 1953 |
| 2,689,173 | Clarke | Sept. 14, 1954 |

OTHER REFERENCES

Franklin et al.: American Chemical Journal, vol. 20, 1898, pages 834–835.